United States Patent [19]

Akasaka

[11] 4,112,449
[45] Sep. 5, 1978

[54] STOP MOTION DEVICE FOR MOTOR DRIVEN DEVICE

[75] Inventor: Shigeo Akasaka, Kodaira, Japan

[73] Assignee: Nippon Kogaku K.K., Tokyo, Japan

[21] Appl. No.: 723,583

[22] Filed: Sep. 15, 1976

[30] Foreign Application Priority Data

Oct. 4, 1975 [JP] Japan .............................. 50-119378

[51] Int. Cl.² .......................... G03B 1/18; B65H 25/04
[52] U.S. Cl. ....................................... 354/173; 242/57
[58] Field of Search ................ 354/173; 318/469, 626; 352/155, 175; 242/57

[56] References Cited

U.S. PATENT DOCUMENTS 2,570,944 10/1951 Hauser ............................... 242/57 X
3,051,405 8/1962 Lyon ................................. 242/57 X

*Primary Examiner*—Donald A. Griffin
*Attorney, Agent, or Firm*—Shapiro and Shapiro

[57] ABSTRACT

In a motor driven device having a switch for opening and closing an electric circuit for driving a motor, a stop motion device adapted to transmit the drive of the motor to produce an output comprises first transmission means displaceable between a closing position for closing the switch and an opening position for opening the switch and operatively associated with the motor, second transmission means operatively associated with the first transmission means to transmit the drive of the motor to the outside thereof, and means for biasing the first transmission means more toward the closing position when it is in said closing position. The first transmission means may thus be displaced to the opening position when an extraneous force suppressing the output during operation acts on the first transmission means more strongly than the biasing force of the bias means.

10 Claims, 5 Drawing Figures

STOP MOTION DEVICE FOR MOTOR DRIVEN DEVICE

BACKGROUND OF THE INVENTION

1. Field of the Invention

This invention relates to a stop motion device for automatically stopping a motor driven device mounted at the bottom of a camera when film has been completely wound up to its end.

2. Description of the Prior Art

In some of the stop motion devices of this type, the tension produced in the film when it has been wound up to its end is utilized to cause the motor driven device to slip and be stopped by an electrical treatment. However, the motor drive still continues to act for a predetermined time after the film has been tensioned, thus breaking or otherwise injuring the film.

SUMMARY OF THE INVENTION

It is an object of the present invention to elminate the above-noted disadvantage and to provide a stop motion device for stopping the motion of the motor driven device when the film in the camera has been wound to its end or supply of the whole film has been terminated.

It is another object of the present invention to provide a mechanism for restoring the motor driven device from its stopped condition to its original or operative condition.

The present invention utilizes the difference in motion between the film side and the motor side at the termination of film supply.

More specifically, a feature of the present invention is that the film advance transmission mechanism from the motor to the film is divided into film side transmission means operatively associated with the film and motor side transmission means, part or whole of which is displaceable, so that at the termination of film supply, even if the motion of the film side transmission means is stopped, the motor side transmission means is still subjected to the motion of the motor and then, rapidly displaced under the influence of the biasing force of snap action bias means secured to the motor side transmission means, whereby an auxiliary switch in the motor driving circuit is opened.

The above and other objects and features of the present invention will become fully apparent from the following detailed description of some embodiments of the invention taken in conjunction with the accompanying drawings.

BRIEF DESCRIPTION OF THE DRAWINGS

FIG. 1 illustrating the essential portions of the device during operation of the motor drive, FIG. 2 illustrating the essential portions of the device at the termination of film supply, and FIG. 3 illustrating the restoration mechanism for the displacement member.

FIG. 4 illustrating the essential portions of the device during operation of the motor drive and FIG. 5 illustrating the essential portions of the device at the termination of film supply.

DESCRIPTION OF THE PREFERRED EMBODIMENTS

Figure 1:
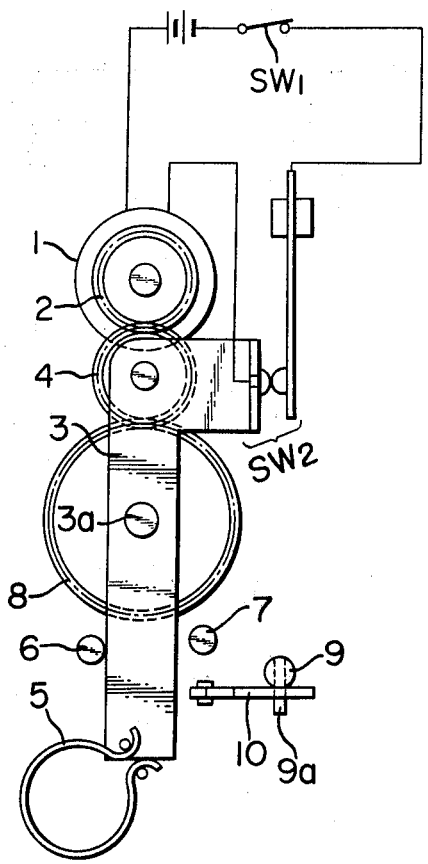
FIGS. 1 to 3 show a first embodiment of the present invention.
Figure 2:
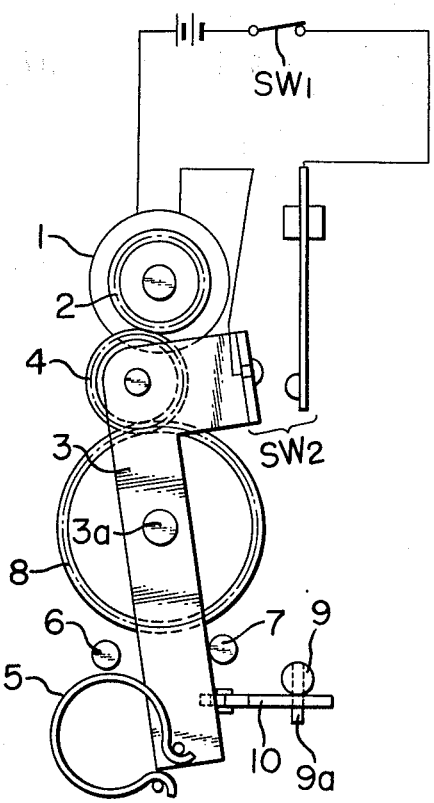
Figure 3:
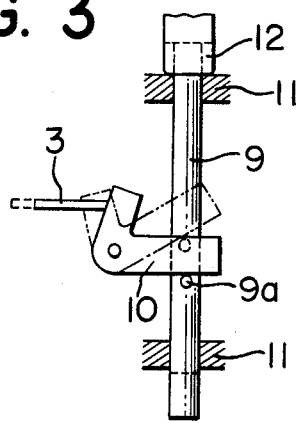

Referring to FIGS. 1 to 3, there is shown a first embodiment of the present invention. In FIG. 1, a motor 1 is electrically energized and deenergized through an extraneously operable main switch SW1 and a subswitch SW2 which will hereinafter be described. A motor side gear 2 is mounted coaxially with the motor 1 and in meshing engagement with a displacement gear 4 (first transmission member) mounted on a displacement member or lever 3 rotatable about a shaft 3a. The movable contact of the subswitch SW2 is provided on one end of the displacement lever 3 and a toggle spring 5 (which is a snap action bias means) is secured to the other end of the displacement lever 3, which is thus biased clockwise. A limit pin 6 is provided to limit the clockwise rotation of the lever 3 to a closing position for closing the subswitch SW2 and a limit pin 7 is provided to limit the counter-clockwise rotation of the lever 3 to an opening position for opening the subswitch SW2. The elements 2 to 4 together constitute motor side transimission means and the elements 3 and 4 also constitute a displacement element.

A film side gear 8 (second transmission member), which is connected to the film transport mechanism of a camera body (not shown), is supported on the same shaft 3a on which the displacement lever 3 is mounted, and is normally in meshing engagement with the displacement gear 4. A rewind lever 9 operable by means of an extraneously operable rewind knob (not shown) is slidably mounted on the main body 11 of the motor driven device, and has a pin 9a studded therein. A restoration lever 10 engageable with the displacement lever 3 is rotatably mounted to the device body 11 and in meshing engagement with the pin 9a. The rewind lever 9 and the restoration lever 10 together constitute a restoration mechanism (see FIG. 3).

In FIG. 1 wherein the motor drive is taking place, the switches SW1 and SW2 are both closed so that the clockwise rotation of the motor 1 is transmitted through the motor side gear 2, the displacement gear 4 and the film side gear 8 to the film, which is thus advanced.

When a predetermined number of frames of the film has been exposed, film transport becomes impossible because the film is secured to the film magazine shaft, and therefore the film side gear 8 stops rotating. Since, however, both the two switches SW1 and SW2 remain closed on the motor side, the motor 1 and the motor side gear 2 still continue to rotate. As the result, the displacement gear 4 continues to rotate counter-clockwise about its own axis while revolving counter-clockwise about the film side gear 8 secured for rotation about the shaft 3a, as shown in FIG. 2. This necessarily results in counter-clockwise rotation of the displacement lever 3 supporting the displacement gear 4, so that the fulcrum of the toggle spring 5 on the displacement lever 3 is displaced rightwardly and by the biasing force of this spring 5, the displacement member 3, 4 is displaced with a rush to the position of FIG. 2, namely, the opening position for opening the subswitch SW2. Thus, the motor 1 stops rotating. If the amount of displacement of the displacement member 3, 4 is so limited that its engagement with the motor side gear 2 may be kept to any slightest extent, the restoration (from the opening position to the closing position) of the displacement member 3, 4 which will hereinafter be described may be accomplished smoothly.

The above-described restoration of the displacement member 3, 4 takes place in response to operation of the rewind knob (not shown) of the motor driven device. Such restoration is illustrated in FIG. 3, wherein solid lines indicate the position prior to the restoration and dots-and-dash lines indicate the complete restoration.

When the rewind knob is operated to its rewind position, the rewind lever 9 is displaced upwardly, as viewed in FIG. 3, to thereby raise a rewind button 12 at the bottom of the camera body and release a sprocket while, at the same time, the upward displacement of the pin 9a causes counter-clockwise rotation of the restoration lever 10 (leftward direction in FIG. 2), so that the displacement lever 3 is displaced leftwardly (clockwise in FIG. 2) to its closing position, thus shifting the sub-switch SW2 from its open position to its closed position. Also, the displacement gear 4 is brought back into complete meshing engagement with the motor side gear 2.

Figure 4:
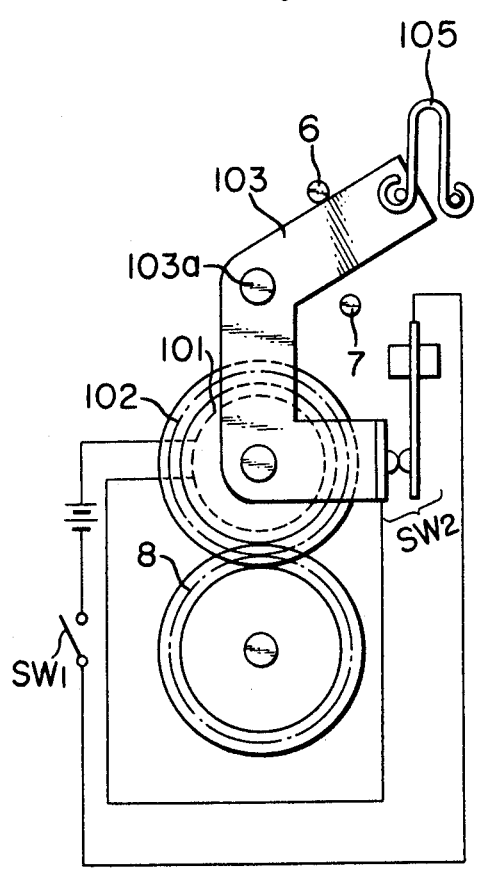
FIGS. 4 and 5 show a second embodiment of the present invention.
Figure 5:
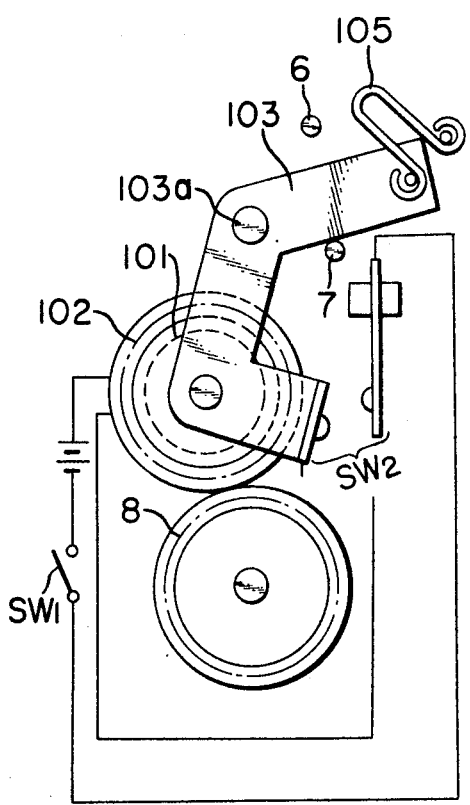

Reference will now be had to FIGS. 4 and 5 to describe a second embodiment of the present invention. Reference characters identical to those in the first embodiment are identical in significance to those in the first embodiment.

In this embodiment, the displacement gear 4 shown in the first embodiment is eliminated and the whole of the motor side transmission means including the motor 1 is made displaceable. In FIG. 4, a motor 101 and a motor side gear 102 are supported on a displacement lever 103 for rotation about a shaft 103a. Thus, when the film gear 8 is stopped upon termination of the film supply, the motor side gear 102 rotates counter-clockwise while revolving clockwise about the shaft 103a, so that a toggle spring 105 which has so far biased the displacement lever 103 counterclockwise is rapidly displaced to open the subswitch SW2. That is, in this embodiment, the motor side gear 102 and displacement lever 103 which form the motor side transmission means also constitute a displacement member.

By using gears, further embodiments may be provided in which the shaft 103a of the displacement lever 103 in the second embodiment may be common to the film side gear 8 as in the first embodiment or in which the shaft 3a of the displacement lever 3 in the first embodiment may be disposed separately from the shaft of the film side gear 8 as in the second embodiment.

The transmission of the film advance transmission mechanism is not limited to the above-described gears but may include a friction wheel or an intermediate idle articulation (belt, chain, rope, connecting rod or the like). However, these would sometimes require an auxiliary mechanism which would in turn lead to a more complicated construction than the arrangement using gears.

It will be apparent that the movable contact of the subswitch need not always be provided on the displacement member as in the shown embodiments.

In some devices, the motor drive is imparted to the rewind with the rewind shaft engaged with the film magazine shaft in the camera body during rewind operation, but such engaging action may have operatively associated therewith the restoration of the displacement member from its opening position to its closing position.

In other words, the change-over action of the member operated during the film rewind (generally called as a film rewinding member) may have operatively associated therewith the restoration of the displacement member.

According to the present invention, as will be appreciated from the foregoing, as soon as film supply is terminated, the motor driving electric circuit switch in the motor driven device is opened to stop the drive of the motor and this eliminates any unreasonable force exerted on the film or the device itself and any injury imparted to the film.

Also, by operatively associating the restoration of the displacement member with the change-over action of the film rewinding member, the release from the stopped condition may be accomplished with great ease and by a very simple construction of mechanism.

I claim:

1. In apparatus having an electric motor energized from a power circuit for driving a mechanism, a stop motion device for deenergizing the motor when the mechanism is prevented from moving, the stop motion device comprising switch means for opening and closing the power circuit, a displacement member displaceable between a closing position for closing the switch means and an opening position for opening the switch means, means for urging the displacement member in the direction of the closing position when the displacement member is positioned at the closing position, a first transmission member rotatably supported on the displacement member and rotated in response to energization of the motor, a second transmission member engaged with the first transmission member and normally rotated thereby to drive said mechanism, and means supporting said displacement member such that when said mechanism is prevented from moving and the second transmission member is stopped, the first transmission member is compelled to turn around the second transmission member by the driving force of the motor and to displace the displacement member to the opening position.

2. A stop motion device according to claim 1, further comprising means for urging the displacement member in the direction of the opening position when the displacement member is at the opening position.

3. A stop motion device according to claim 2, wherein both of said urging means are constituted by a toggle spring.

4. A stop motion device according to claim 2, wherein the displacement member is supported by its supporting means for pivotal movement about an axis parallel to the rotational axis of said first transmission member.

5. A stop motion device according to claim 4, wherein the axis of pivotal movement of the displacement member is the same as the rotational axis of the second transmission member.

6. A stop motion device according to claim 4, wherein the axis of pivotal movement of the displacement member is parallel to the rotational axis of the second transmission member.

7. A stop motion device according to claim 6, wherein the motor is fixed to the displacement member.

8. A stop motion device according to claim 2, further comprising restoration means for shifting the displacement member from the opening position to the closing position.

9. A stop motion device according to claim 2, wherein said mechanism is a film transport mechanism of a camera.

10. A stop motion device according to claim 9, wherein the camera is of the type used with a film magazine and the transport is prevented from moving when a predetermined amount of film has been supplied from the magazine and further film supply from the magazine is prevented.

* * * * *